United States Patent
Dankar et al.

(10) Patent No.: US 8,374,634 B2
(45) Date of Patent: Feb. 12, 2013

(54) SYSTEM AND METHOD FOR AUTOMATED ANALYSIS COMPARING A WIRELESS DEVICE LOCATION WITH ANOTHER GEOGRAPHIC LOCATION

(75) Inventors: Ajay Dankar, Fremont, CA (US); Sunita Reddy, Fremont, CA (US); Michael P. Mortier, Newcastle, WA (US); Michael F. Buhrmann, Redmond, WA (US); Charles L. Dennis, Sammamish, WA (US); Randall A. Snyder, Las Vegas, NV (US)

(73) Assignee: Finsphere Corporation, Bellevue, WA (US)

( * ) Notice: Subject to any disclaimer, the term of this patent is extended or adjusted under 35 U.S.C. 154(b) by 1178 days.

(21) Appl. No.: 11/933,803

(22) Filed: Nov. 1, 2007

(65) Prior Publication Data

US 2008/0227471 A1    Sep. 18, 2008

Related U.S. Application Data

(60) Provisional application No. 60/895,144, filed on Mar. 16, 2007, provisional application No. 60/909,718, filed on Apr. 3, 2007, provisional application No. 60/979,663, filed on Oct. 12, 2007.

(51) Int. Cl.
*H04W 24/00* (2009.01)
(52) U.S. Cl. .................. 455/456.6; 455/456.1; 455/403; 370/328; 370/338
(58) Field of Classification Search .......... 370/328–338; 455/410, 411, 419, 414.1, 414.2, 422.1, 456.1–456.6, 455/440, 435.1, 435.2, 403, 550.1–575.9; 380/247–250
See application file for complete search history.

(56) References Cited

U.S. PATENT DOCUMENTS

| | | | |
|---|---|---|---|
| 4,200,770 | A | 4/1980 | Hellman et al. |
| 4,218,582 | A | 8/1980 | Hellman et al. |
| 5,237,612 | A | 8/1993 | Raith |
| 5,819,226 | A | 10/1998 | Gopinathan et al. |
| 5,953,652 | A | 9/1999 | Amin et al. |
| 5,960,411 | A | 9/1999 | Hartman et al. |

(Continued)

FOREIGN PATENT DOCUMENTS

| | | |
|---|---|---|
| WO | WO9641488 | 12/1996 |
| WO | 00/67168 A2 | 11/2000 |

(Continued)

OTHER PUBLICATIONS

Mobile Location Protocol V3.2, Open Mobile Alliance Ltd, Nov. 24, 2005.

(Continued)

*Primary Examiner* — Chuong A Ngo
(74) *Attorney, Agent, or Firm* — Foster Pepper PLLC; Richard T. Black; P. G. Scott Born

(57) ABSTRACT

A system and method for automatically comparing obtained wireless device location information from a wireless network and comparing that location with another independent source geographic location is provided. Location information is derived from two or more sources in a multiplicity of ways and a comparison is made within a Location Comparison Engine. The Location Comparison Engine makes use of databases that assist in resolving obtained raw positioning information and converting that positioning information into one or more formats for adequate location comparison. Results of the location comparison are deduced to determine if the wireless device is in some proximity to some other activity source location. Other location information used for comparison may be obtained from a multiplicity of sources, such as another network based on some activity of the wireless device user, another wireless device via a wireless network, or any system capable of providing location information to the Location Comparison Engine.

8 Claims, 11 Drawing Sheets

U.S. PATENT DOCUMENTS

| | | | |
|---|---|---|---|
| 6,097,938 A * | 8/2000 | Paxson | 455/410 |
| 6,223,290 B1 | 4/2001 | Larsen et al. | |
| 6,535,728 B1 | 3/2003 | Perfit et al. | |
| 6,895,236 B2 | 5/2005 | Shuster | |
| 7,188,251 B1 | 3/2007 | Slaughter et al. | |
| 7,327,705 B2 | 2/2008 | Fletcher et al. | |
| 7,376,431 B2 | 5/2008 | Niedermeyer | |
| 2003/0169881 A1* | 9/2003 | Niedermeyer | 380/258 |
| 2003/0182194 A1 | 9/2003 | Choey et al. | |
| 2004/0123150 A1* | 6/2004 | Wright et al. | 713/201 |
| 2004/0221163 A1 | 11/2004 | Jorgensen et al. | |
| 2005/0239445 A1 | 10/2005 | Karaoguz et al. | |
| 2005/0278542 A1 | 12/2005 | Pierson | |
| 2006/0194592 A1* | 8/2006 | Clough | 455/456.3 |
| 2007/0072587 A1 | 3/2007 | Della Torre | |
| 2007/0100650 A1 | 5/2007 | Ramer et al. | |
| 2007/0186106 A1 | 8/2007 | Ting | |
| 2007/0250920 A1 | 10/2007 | Lindsay | |
| 2007/0271379 A1 | 11/2007 | Carlton et al. | |
| 2008/0207220 A1* | 8/2008 | Aaron | 455/456.1 |

FOREIGN PATENT DOCUMENTS

| | | |
|---|---|---|
| WO | WO2004079499 | 9/2004 |
| WO | WO2007004224 | 1/2007 |

OTHER PUBLICATIONS

Williams, David H. and Christensen, Gerry, The Definitive Guide to: Mobile Positioning & Location Management, copyright 2005 Mind Commerce.

Randall A. Snyder and Michael D. Gallagher, Wireless Telecommunications Networking with ANSI-41, 2d. Ed., 2001, pp. 12-14, 45, 84-85, McGraw-Hill Companies, New York, New York.

* cited by examiner

FIG. 3

EXEMPLARY WIRELESS DEVICE LOCATION DATABASE

| Wireless Device ID | Location Position | Geographic Place | Date: Time |
|---|---|---|---|
| +1-702-555-0000 | MSC ID | Geographic Name, ID or Coordinates | 09:26:2007: 12:34:56 |
| +1-702-555-1234 | Cell Site ID | Geographic Name, ID or Coordinates | 09:24:2007: 22:45:07 |
| +1-206-555-1111 | Cell Site/Sector ID | Geographic Name, ID or Coordinates | 09:21:2007: 13:12:45 |
| +1-425-555-1234 | Latitude/ Longitude | Geographic Name, ID or Coordinates | 09:29:2007: 19:22:23 |
| +1-425-555-2222 | Other Coordinates | Geographic Name, ID or Coordinates | 09:30:2007: 04:55:27 |
| ... | ... | ... | ... |

| Wireless Device ID | Activity Source Location | Geographic Place | Date: Time |
|---|---|---|---|
| +1-702-555-0000 | Physical Address | Geographic Name, ID or Coordinates | 09:26:2007: 12:34:32 |
| +1-702-555-1234 | Virtual Address | Geographic Name, ID or Coordinates | 09:24:2007: 22:44:54 |
| +1-206-555-1111 | Representation of Address | Geographic Name, ID or Coordinates | 09:21:2007: 13:12:11 |
| +1-425-555-1234 | Geographic Name, ID or Coordinates | Geographic Name, ID or Coordinates | 09:29:2007: 19:22:08 |
| ... | ... | ... | ... |

EXEMPLARY ACTIVITY SOURCE LOCATION DATABASE

Figure 9:
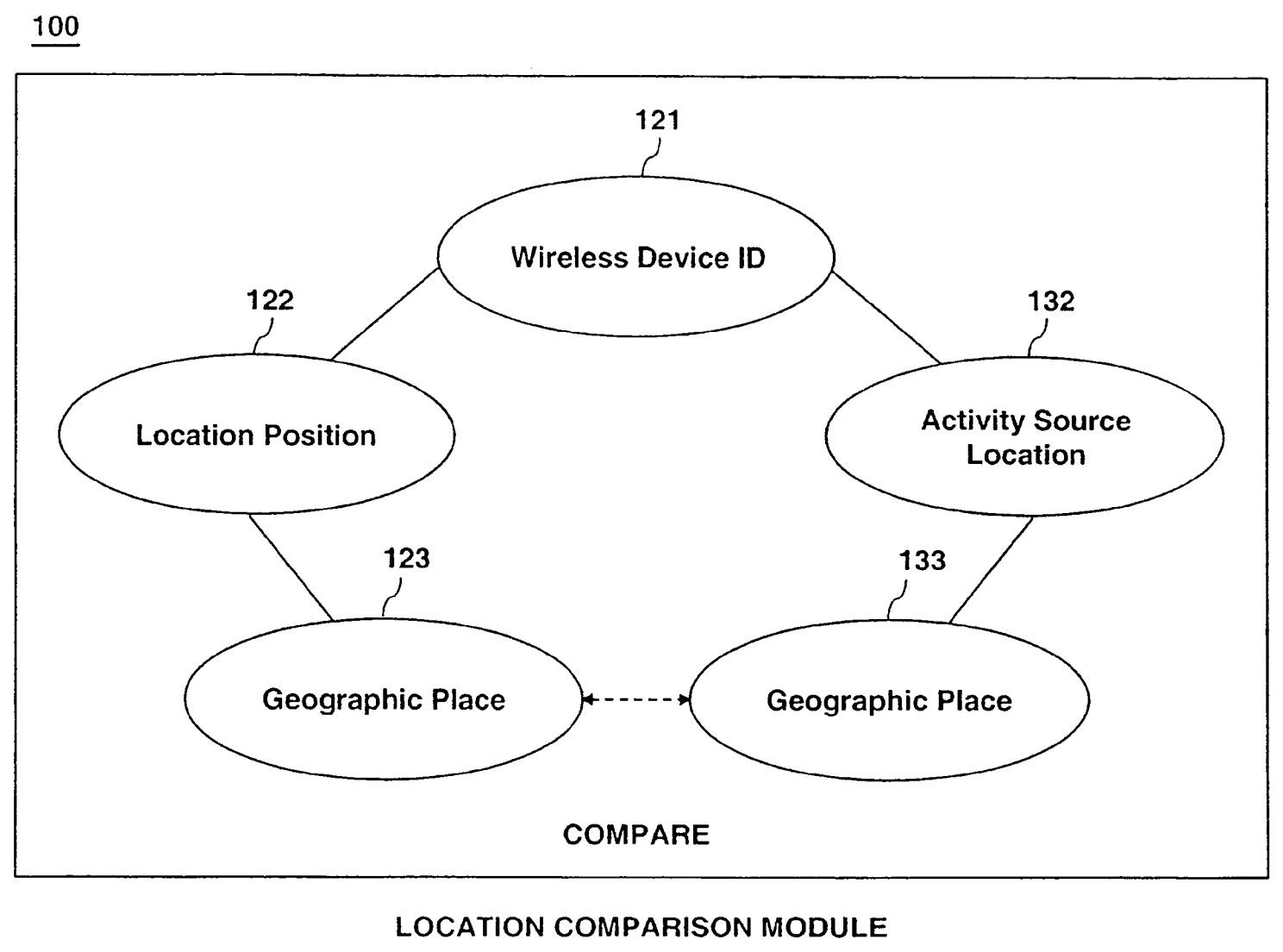

LOCATION COMPARISON MODULE

- 121 Wireless Device ID
- 132 Activity Source Location
- 133 Geographic Place
- 122 Location Position
- 123 Geographic Place

COMPARE

100

SYSTEM AND METHOD FOR AUTOMATED ANALYSIS COMPARING A WIRELESS DEVICE LOCATION WITH ANOTHER GEOGRAPHIC LOCATION

CROSS-REFERENCE TO RELATED APPLICATIONS

This application is claims the benefit of U.S. Ser. Nos. 60/895,144 filed Mar. 16, 2007, 60/909,718 filed Apr. 3, 2007 and 60/979,663 filed Oct. 12, 2007, all of which applications are incorporated herein by reference.

BACKGROUND OF THE INVENTION

1. Technical Field of the Invention

The present application primarily relates generally to systems and methods directed to location-based services within a wireless telecommunications or data communications network, and more particularly to other technical fields such as technologies used to authenticate secure transactions, technologies to verify and validate user identities and for use with any application where the results of comparing two or more geographic locations has some utility or value.

2. Background of Related Art

Wireless device location information is necessary for the operation of cellular telecommunications services. This location information enables calls to be established from these devices and calls to be delivered to these devices wherever they may be, even if they are outside a user's home network. Location information is also used to effect hand-offs among cell sites within the cellular network. The term "cellular" refers to a network of individual "cells" or "cell site" areas covered by radio transceiver systems that control communications within that cell site. Each cell site provides a limited range and radius of radio coverage to wireless devices across a defined and limited geographic area. Cellular radio transceivers within a cell site serve wireless devices within the radius of that particular cell site. Multiple cellular radio transceiver systems (or cell sites) are controlled by a centralized computer switching system. This switching system, known as the Mobile Switching Center (MSC), has information about which cell sites currently provide radio communications services to particular wireless devices. Hence, a particular MSC also has a defined and limited geographic coverage area which is defined as the aggregate of all of the cell site geographic areas of the cells that it controls. Cell site areas may also be subdivided into smaller "cell sectors." This subdivision of cell sites into sectors enables more efficient use of radio spectrum which, in turn, enables cellular telecommunications service to be provided to more wireless devices within the original cell site area. The defined geographic areas of MSCs, cell sites and cell site sectors are location areas for which the MSC controls voice and data communications to and from individual wireless devices. Therefore, the MSC maintains current information about which wireless devices are served by which cell sites and cell site sectors. The geographic area of an MSC may be quite large, hundreds or thousands of square miles. The geographic area of a cell site typically covers a few square miles or less (especially in urban areas) and the geographic area of a cell site sector is about one-third that of a cell site. However, for a variety of vital wireless communications services, as well as the ability to enable additional value-added services, much more precise positioning information of wireless devices may be required.

Precise wireless device location information derived by a wireless network has become increasingly important in recent years. So-called "Location Based Services" (LBS) were originally required to locate wireless telecommunications network users in emergency situations. An individual may use a wireless device to call for emergency assistance. The wireless telecommunications network automatically derives the location of the mobile device and uses that location information to inform emergency services personnel of the whereabouts of the caller. This scenario is in contrast to wireline telephones used to call for emergency assistance as a wireline telephone used to make an emergency call is always associated with a static geographic location or address. Wireless or mobile devices, on the other hand, can be in any geographic location and can be moved from place to place. Hence, technologies required to precisely, automatically and dynamically locate a moveable wireless device in real-time were implemented and deployed by the wireless network operators. These technologies have proven highly useful and valuable enabling emergency services personnel to locate individuals in emergency situations.

In the late 1990s, both as a result of government regulations requiring location-based technologies for emergency services and the creation of technology standards and specifications to provide location information for wireless devices, many other value-added applications and services were created to make use of wireless location information. These applications and services are provided by both the wireless network operators themselves as well as by third-party application and services providers. Principally among these are two categories of applications and services: 1) mapping and navigation services and 2) so-called "concierge" services. Mapping and navigation services provide wireless device users the ability to find points of interest, proximity to those points of interest and real-time directions to get to those points of interest. Concierge services provide a variety of information to a user based on their current and real-time location or a location input by the user. Among these services are listings of closest locations of points of interest such as hotels, restaurants, transportation and entertainment venues. Many of these services, including emergency services, require precise location information which may only be obtained if the wireless network employs additional sophisticated location technologies. Chief among these technologies is the satellite-based Global Positioning System (GPS). Use of GPS for precise location services requires GPS technology to be incorporated into wireless devices as well as within the wireless network. However, to provide precise location information about wireless devices where GPS is not used, smart antenna technology may be employed. Smart antenna technology requires special equipment to be deployed at each cell site. This equipment analyzes multiple radio transceiver signals coming from wireless devices. Mathematical algorithms are used to determine the position of the wireless device based on the time difference of arrival (TDOA) or the angle of arrival (AOA) of the radio signals, or both. GPS is typically more accurate for precise positioning of a wireless device; however, both GPS and smart antenna technology have the potential to provide Latitude and Longitude coordinates for a wireless device from a few feet to a few hundred yards. Therefore, wireless networks currently maintain the ability to provide positioning information for particular wireless devices for areas as wide as an MSC serving area, to smaller cell site areas, to smaller cell site sector areas and many provide positioning information to a high degree of resolution by providing more precise latitudinal and longitudinal coordinates.

In a seemingly unrelated area of technology, distinct from wireless device location technology, there exists a myriad of current methods that provide for authentication, verification and validation of user activity as well as for user identity. These technologies are used to ensure that an individual is the actual person claimed for the benefit of the activity or transaction. Today, many employed technologies have greatly reduced fraudulent transactions, but instances of fraudulent activity still occur. These technologies are employed, for instance, when an individual engages in some transaction that requires some degree of security. An automated financial transaction is a common example of a secure transaction requiring mechanisms to authenticate, verify and validate the identity of the individual attempting to perform the transactional activity. Primary examples of such transactions include accessing automated teller machines (ATMs) to obtain money or to perform some other banking function and the use of credit or debit cards at a point of sale (POS) to make a purchase. Even electronic commerce-based transactions (e-commerce) and online banking, where an individual enters financial information into a website form on a personal computer to make a purchase or to perform a financial activity, require some form of authentication, verification and validation. Typical means to authenticate individuals attempting a secure transaction include use of personal identification numbers (PINs) or some other type of information that is assumed to be known only by an authorized user involved in the transaction. Other means of documentation may also be used to verify identity, such as a driver's license or other form of photo identification. Even the use of biometric devices, such as fingerprint scanners, may be used to authenticate an individual attempting to perform a secure transaction. However, even with these and many other technologies employed, fraudulent activity still occurs and identity theft and misrepresentation remains a problem.

In addition, many existing fraud detection and prevention technologies can and do provide a false positive indication of fraudulent activity. Besides the fraud detection and prevention mechanisms already mentioned, other technologies may be employed such as behavioral profiling which is used to detect anomalous behavior. These technologies employ intelligent algorithms to analyze past user behavior when a user attempts to engage in a some activity or transaction that is similar to a previous activity or transaction. If the individual's behavior when engaging in a secure activity is not consistent with that individual's past behavior, a likelihood of fraudulent activity may be deduced. Common examples of this situation are when an individual uses a credit card to purchase some product or service in a foreign country where they have never previously performed a similar transaction. Or, the amount of a particular transaction is significantly different from any previous transaction. This behavior may appear anomalous to a fraud detection system and the activity or transaction being performed may be terminated before any potential fraud is perpetrated. If this is in fact a false positive indication and the individual is actually an authorized user, the user suffers the consequences of a failed transaction and the service provider is perceived to have provided a poor quality of service.

Also, debit or credit cards may be stolen, PINs may become compromised and information meant to be held only by authorized users may become known to others. The reality is that other means to perform authentication, verification and validation of authorized users to assist in an authentication process continues to have relevance for transactions where fraudulent activity remains a problem. In many of the examples provided, the authentication technology employed involves some user interaction with a computerized device that is typically connected to a data communications network. The data communications network may maintain location information representing the actual geographic place where a secure transaction or some activity by an individual is occurring. This is true in the case of ATM transactions, automated POS transactions, personal computer-based transactions and others.

To provide authentication or additional authentication confidence where individuals attempt to perform some automated secure transaction or activity, the location of the secure transaction or activity may be ascertained from the network that is being accessed via the transactional application. As the use of wireless devices has become ubiquitous, it may be reasonably assumed that individuals carrying such a device would have the device with them while attempting to engage in a secure transaction or activity. In this case, comparing the location of the wireless device obtained from the wireless network with the location where the user of the wireless device is attempting to engage in a secure transaction or activity, may provide resultant information that may be used to authenticate, verify or validate that the user is in fact who he claims to be. Moreover, if the result from such a geographic location comparison reveals that the wireless device is in some location other than where the secure transaction or activity is taking place, it may be reasonably assumed that the user is not who he claims to be. Depending on the resolution of the geographic locations obtained from both the wireless network and some other data communications network where an activity or transaction occurs, varying degrees of confidence may be ascertained as to the authenticity of that activity or transaction. False positive indications of anomalous behavior may also be avoided. An example of this may be when an individual performs an activity or transaction and that individual is in a significantly different location than previously visited but the individual is in fact who he claims to be.

Besides the mitigation of fraudulent activity, knowledge of the location of one or more individuals for use in value-added applications may be useful. Such knowledge of both the location of a wireless device as well as the location of the wireless device user performing some automated activity or transaction may provide utility regardless of whether that activity requires security. Many value-added applications may benefit from such comparative geographic location information such as social networking applications or multi-player online gaming applications where it may be desirable for an individual to know the proximity of friends with which they wish to communicate. These friends may be engaging in some automated activity where the application is connected to a computer network where location information may be ascertained or they may be wireless device users themselves where the location of their wireless devices may be obtained from the same or another wireless network.

Many automated fraud detection and prevention systems may assign a value or range of values indicating the likelihood of fraudulent activity. These assigned values may depend on the security level required for a particular transaction or activity as well as the methods used to indicate fraud. Such a mechanism may also be employed when the comparison of two or more locations, at least one being the location of a wireless device obtained from a wireless network, results in the ability to ascertain varying degrees of confidence based on the proximity of the two geographic locations being compared.

To successfully compare two or more geographic locations, one of which being the location of a wireless device obtained from a wireless network, one or more unique wireless device identification values is required to appropriately associate the geographic locations with each other. Many unique wireless identification values are available for use.

Among those that may be appropriate is the Mobile Directory Number (MDN) which is defined as the dialable directory number of the wireless device. The MDN is a uniquely provisioned value for each cellular-based telecommunications user. Other unique wireless device identification values that may be used include the serial number of the wireless device or the unique subscription identifier that may be found, for example, on a smart card used within a wireless device. Depending on the wireless technology and device used, the unique wireless device identifier appropriate for the device may be used to facilitate the geographic location comparison. Besides cellular telecommunications technology, other wireless devices from which location information may be derived and obtained from a data communications network may be supported. These wireless devices may include any type of Global Positioning System (GPS) device, Mobile Internet Device (MID), Radio Frequency Identification (RFID) device, Near Field Communications (NFC) device (such as Bluetooth or infrared-based devices) or any wireless device.

When performing a comparison among two or more particular geographic locations, the location information for a wireless device may be provided in a variety of formats. Mobile Switching Center (MSC) identification, cell site identification, cell sector identification and even Latitude and Longitude or other coordinates may be provided as well as a geographic area or place name mapped to these identifiers and coordinates. For location information obtained from other types of data communications networks, the format may be in the form of a physical geographic address (e.g., street number, street name, city, state, province, country, postal code, ZIP code, etc.), a physical data communications address (e.g., an Internet Protocol geographic address of the form XX.XX.XX.XX), a logical or virtual place or data communications address (e.g., a post office box or a uniform resource locator or URL address), some representation of an address (e.g., an alias name or label identifying an address), a geographic place name (e.g., "Central Park"), mapping coordinates (e.g., Latitude and Longitude or other projection coordinates) or a mapping identifier in some customized format. A system and method that compares such geographic locations with each other that may be obtained in any of these formats requires a mechanism to convert these different location formats into a common format type enabling comparison. A method or mechanism to derive proximity among the geographic locations that are compared may also be beneficial.

There is a need for additional and improved systems and methods to assist, for example, with fraud management systems and identity recognition and authentication. These systems are employed in a variety of industries, including banking and finance, commerce, security and others. In many cases, existing technologies employ detection methods as opposed to prevention methods. That is, many technologies and systems currently in place attempt to detect some fraudulent activity after it has occurred, and then prevent similar fraudulent activity in the future based on this detection. These methods are not optimal as fraudulent activity may be successful in at least one instance prior to detection and subsequent prevention. Prevention of fraudulent activity the first time an attempt is made is certainly preferable, as well as reducing incidences of false positive indications of fraud. No fraud detection and prevention system is perfect and there is always a need to employ additional technologies to further reduce fraud and identity theft, thereby reducing the economic impact of such undesired activity. Although many fraud detection and prevention technologies exist today, these technologies are constantly evolving and new fraud prevention technologies can always be employed to maintain additional security and lessen the economic impact. In addition, a system that can provide proximity information among one or more locations has implications beyond fraud prevention. Proximity information can add great value to other technologies such as social communications among groups and individuals. Any technology that enables such social communications may be enhanced by allowing users of that technology to know the proximity of other users.

SUMMARY OF THE INVENTION

Accordingly, an object of the present invention is to provide systems and methods to compare a wireless device's location obtained from a wireless network with the wireless device user's location. This object of the present invention is achieved by obtaining the location of a wireless device from a wireless network and obtaining the location of the wireless device user's location from another data network. The location of the wireless device user is obtained as that user performs some automated activity by accessing a device associated with that data network. The obtained locations are compared to determine proximity among them and a result based on that proximity may be derived.

Another object of the present invention is to provide systems and methods to reduce incidences of fraud by validating users in a particular location where they are performing some automated activity requiring access to a secure system. This object of the present invention is achieved by determining the proximity between a wireless device's location and the wireless device user's location and providing those proximity results to a results processing system. Based on the resultant proximity, users accessing the automated system may be determined to be valid or not.

Another object of the present invention is to provide systems and methods to compare a wireless device's location obtained from a wireless network with the wireless device user's location to determine some likelihood of fraudulent activity. This object of the present invention is achieved by assigning an algorithmic value to the comparison results of the compared locations.

BRIEF DESCRIPTION OF ILLUSTRATIVE EMBODIMENTS

Features and advantages of the present invention will become apparent to those skilled in the art from the following description with reference to the drawings. Embodiments of the present invention are illustrated by way of example, and not limitation, in the figures of the accompanying drawings, and in which like references indicate the same or similar elements.

In the drawings,

FIG. 1 depicts the functional entities and modules of an example Location Comparison Engine. Included in the depiction is example connectivity to a Wireless Network, an Activity Mediation System, a Results Processing System, a Wireless Device Location Database, an Activity Source Location Database, a Location Comparison Module, and a Location Comparison Results Module, in accordance with the principles of the present invention.

FIG. 3 shows exemplary entries in a Wireless Device Location Database depicting an association of a unique Wireless Device ID to an obtained Location Position and a Geographic Place.

FIG. 5 shows exemplary entries in an Activity Source Location Database depicting an association of a unique Wireless Device ID to an obtained Activity Source Location.

FIG. 9 shows an exemplary relationship of the information elements to attain a location comparison encompassed by the Location Comparison Module.

DETAILED DESCRIPTION OF ILLUSTRATIVE EMBODIMENTS

Figure 1:
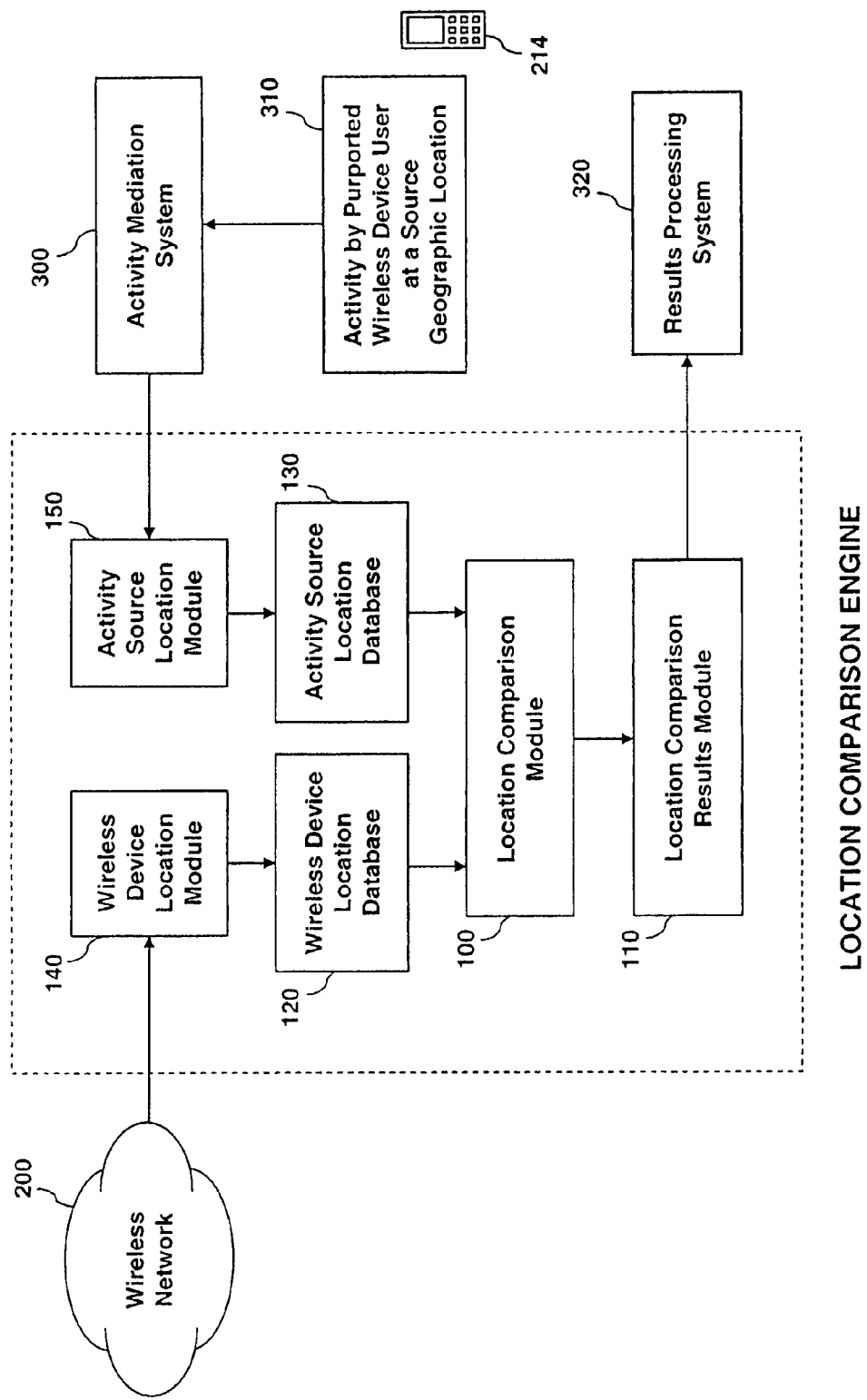

In one embodiment of the present invention, a Location Comparison Engine is provided that enables the location of a wireless device obtained from the wireless network to be compared with the location of the wireless device user engaging in some automated application, transaction or activity at some place where that location information may be automatically derived.

In one embodiment, a Location Comparison Module of the present invention receives both wireless device location information and wireless device user location information in a multiplicity of formats. In this embodiment, the Location Comparison Module determines the resulting proximity among two or more obtained locations being compared. The results of the comparison are then passed to a Location Comparison Results Module that properly formats those results for use with an application. The results may be provided in a multiplicity of formats and used to authenticate, verify or validate a transaction or activity performed through the application, or provide some utility to an application where the results of a comparison of those locations is required. Examples of the obtained formats for wireless device location are Mobile Switching Center (MSC) ID, Cell Site ID, Cell Sector ID, Latitude and Longitude coordinates, other projection coordinates or a geographic area or place name.

In an exemplary operation of the Location Comparison Engine, the Activity Source Location Module receives location information from some Activity Mediation System, such as an Internet Protocol (IP) address. The Activity Mediation System may be any network or system that performs as an intermediary system between an automated transaction or activity by a user and the Location Comparison Engine. The location information may be obtained in a multiplicity of formats according to the capabilities of the Activity Mediation System. Examples of the obtained wireless device user's location are a physical geographic address (e.g., street number, street name, city, state, province, country, postal code, ZIP code, etc.), a physical data communications address (e.g., an Internet Protocol geographic address of the form XX.XX.XX.XX), a logical or virtual place or data communications address (e.g., a post office box or a uniform resource locator or URL address), some representation of an address (e.g., an alias name or label identifying an address), a geographic place name (e.g., "Central Park"), mapping coordinates (e.g., Latitude and Longitude or other projection coordinates) or a mapping identifier in some customized format. The location information is obtained along with a Wireless Device Identifier (ID). The Wireless Device ID is associated with a wireless device user engaging in some automated activity, for example, accessing an ATM to receive money. The Wireless Device ID may have been previously registered with, for example, a financial institution and is associated with the personal database records of that user. The unique Wireless Device ID is typically the dialable Mobile Directory Number (MDN) of the user's wireless device, but may assume other values as appropriate, such as an Electronic Serial Number (ESN) of the device, an International Mobile Subscriber Identity (IMSI) or an International Mobile Equipment Identity (IMEI). Use of the MDN is typical due to global uniqueness among wireless device users and its common use in wireless industry network communications protocols. The MDN may also be an identifier that is commonly used by individuals for personal profiles that may be registered in a variety of service databases, such as for electronic commerce transactions. The MDN of the wireless device may be used to query the Wireless Network via the Wireless Device Location Module for current or last known location information of the wireless device, or location information pertaining to the wireless device may be obtained autonomously by the Wireless Device Location Module from the Wireless Network. Either one of the modules (the Wireless Device Location Module and the Activity Source Location Module) may receive location information independently of one another and based on independent events. Location information may be requested by these modules or the location information may be obtained autonomously.

Once two or more locations are obtained by the Location Comparison Engine, this location information is passed along with the associated and corresponding Wireless Device ID to databases within the Location Comparison Engine to resolve the location information into an appropriate format for adequate comparison. The exemplary Wireless Device Location Database and Activity Source Location Database are employed, to resolve the obtained location information into appropriate geographic mapping information to be used for a particular comparison. The resulting sets of geographic location values derived from the respective databases and associated with the unique Wireless Device ID previously obtained are sent to the Location Comparison Module.

Additionally, the date, time or both of the obtained location information may be recorded as well as other information such as the identifier of the network from which the location was obtained. This date and time information may be especially important during the authentication, verification and validation process to potentially compare the times of past known locations of wireless devices with the times of the most currently known locations of those devices. The age of the last obtained location of a wireless device may assist in determining the authenticity of some purported activity being performed by the wireless device user. Also, time information may assist in evaluating a location comparison. The location information obtained from the wireless network may have become stale, while the location of the purported wireless device user performing some automated activity changes. Depending on the obtained time, along with the location information, of a wireless device, a wireless device user's behavior may be either confirmed or determined to be suspect when compared with the previously or last known obtained time and location.

The Location Comparison Module uses the Wireless Device ID to mutually associate the obtained wireless device location with the obtained location of some automated activity by a wireless device user. The Wireless Device ID may be used as a unique identifier to query the wireless network for the location of that wireless device. That same Wireless Device ID may also be used as a unique identifier within a personal profile that maintains attributes about a wireless device user within some other independent network or system. The Location Comparison Module then analyzes the associated locations and determines the degree of proximity among those locations. The Location Comparison Module then passes the proximity results of the comparison along with the associated Wireless Device ID to a Location Comparison Results Module. The Location Comparison Results Module analyzes the obtained proximity information and assigns one or more results to the Wireless Device ID. The results may be attributed to and made available in a multiplicity of exemplary formats such as arithmetic rankings or scores based on an acceptable predefined distance or a Boolean expression based on a predetermined distance threshold (e.g., a "true" result if the comparison is within a predefined distance or a "false" result if the comparison is outside a predefined distance). The results may also take the form of the appropriately formatted independent locations themselves for use in a particular application. This may be the case, for example, when an application requires the locations themselves to add utility or value to the application, such as in any social communications application, for example in social networking or online multiplayer gaming applications.

The Location Comparison Results Module may then pass the appropriately formatted results of the location comparison for a particular application along with the associated Wireless Device ID to a Results Processing System. The Results Processing System may reside within, or be the same as, the Activity Mediation System or some other system that requires the location comparison results. An exemplary Results Processing System may apply the comparison results to any type of application regardless of the results or the type of application. These applications may include identity authentication systems, activity fraud management systems, social networking applications or online multiplayer gaming applications.

In FIG. 1, one embodiment of a Location Comparison Engine of the present invention includes a Wireless Device Location Module 140, an Activity Source Location Module 150, a Wireless Device Location Database 120, an Activity Source Location Database 130, a Location Comparison Module 100, and a Location Comparison Results Module 110, in accordance with the principles of the present invention. The Location Comparison Module 100 compares location information that is obtained from both the Wireless Network 200 and the Activity Mediation System 300 and subsequently passed to this module from both the Wireless Device Location Database 120 and the Activity Source Location Database 130. The Wireless Network provides location information for the Wireless Device 214 and the Activity Mediation System provides location information from some Activity by the Purported Wireless Device User at a Source Geographic Location 310. Results of the location comparison are sent from the Location Comparison Results Module 110 to a Results Processing System 320. The Results Processing System 320 may then apply the location comparison results to an application that is being used by the Wireless Device User 310. If the location comparison results demonstrate close proximity of the user to the application being accessed or the activity being performed, a reasonable assertion may be made that the user is authentic, or the activity being performed is valid. In contrast, if the location comparison results demonstrate far proximity of the user to the application being accessed or the activity being performed, a reasonable assertion may be made that the user is not authentic, or the activity being performed is invalid. The Results Processing System 320 may be the same functional entity as the Activity Mediation System 300 or may be a separate functional entity from the Activity Mediation System 300.

Figure 2:
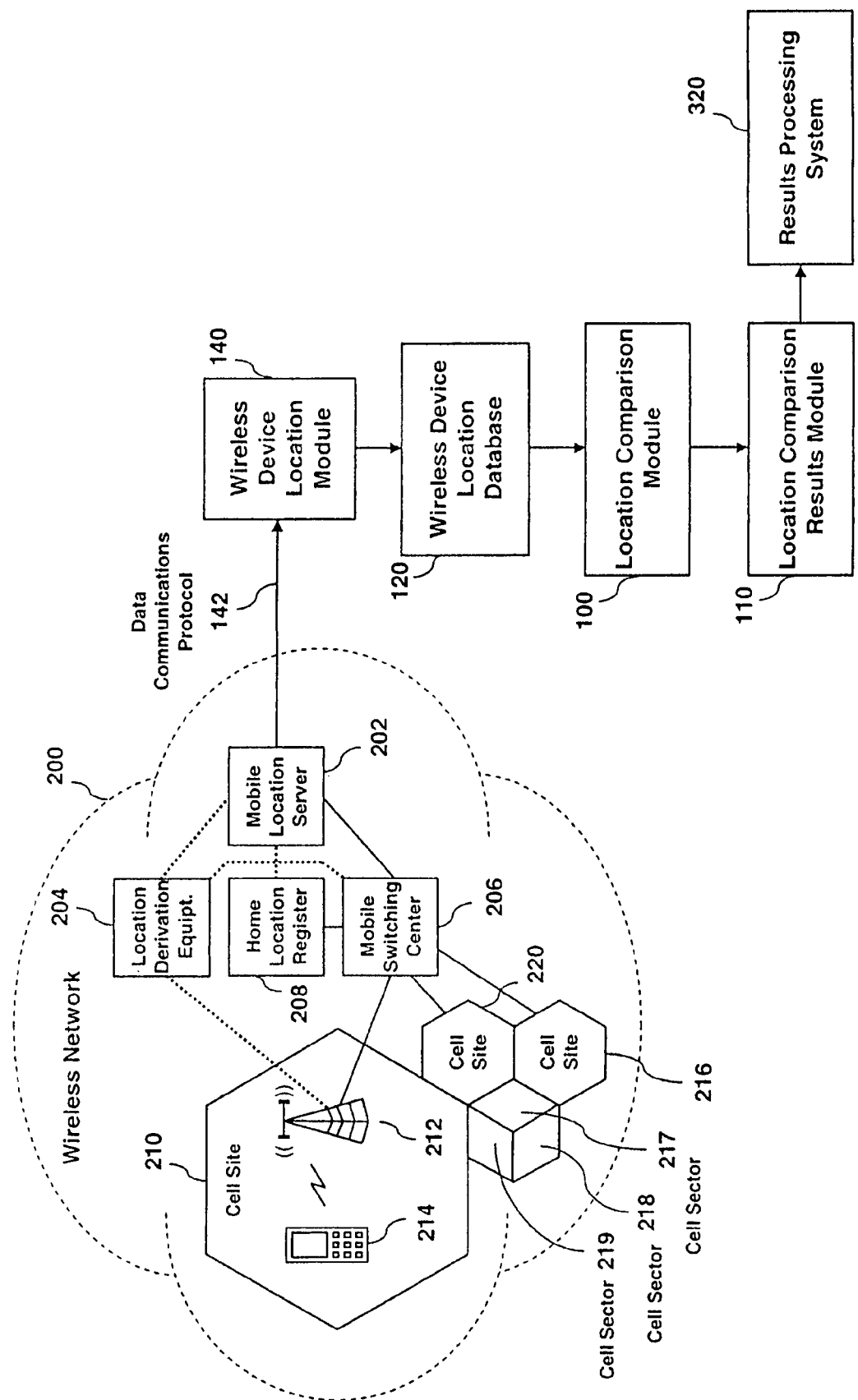
FIG. 2 shows exemplary connectivity of a Wireless Network to the Wireless Device Location Module and the concerned functional entities of an exemplary Wireless Network including the Cell Sites, Mobile Switching Center and a Mobile Location Server.

FIG. 2 depicts an exemplary Data Communications Protocol 142 between the Wireless Device Module 140 of the Location Comparison Engine and an exemplary Mobile Location Server 202 within an exemplary Wireless Network 200. Wireless device location information is obtained by the Wireless Device Location Module 140 via the Data Communications Protocol 142. The Data Communications Protocol 142 may be based, for example, on the Internet Protocol (IP). Examples of the communications protocols used to transfer location information may include, but are not limited to, the Transmission Control Protocol (TCP/IP), the User Datagram Protocol (UDP/IP) and the Hyper-Text Transport Protocol (HTTP). The exemplary Mobile Location Server 202 may retrieve and store location information about any wireless device served by the Wireless Network 200. In FIG. 2, the Mobile Location Server 202 may obtain and store the current or latest known location information known about the Wireless Device 214. The Mobile Location Server 202 may obtain and store the available location information about exemplary Wireless Device 214 by obtaining location information from a multiplicity of functional entities within the Wireless Network 200. These functional entities may include, but are not limited to, the exemplary Mobile Switching Center (MSC) 206, the exemplary Home Location Register (HLR) 208 or optionally, exemplary Location Derivation Equipment 204. The MSC 206 and HLR 208 typically maintain the MSC identifier (MSC ID) as well as the identifier values for exemplary Cell Sites 210, 216, 220 and exemplary Cell Sectors 217, 218, 219 that the MSC 206 controls. The MSC ID is representative of the geographic location area encompassing all of the Cell Sites 210, 216, 220 and Cell Sectors 217, 218, 219 that provide radio communications coverage over an aggregated geographic area. An exemplary Cell Site 210 depicts the geographic location area where the exemplary Wireless Device 214 is currently located. Therefore, the exemplary Mobile Location Server 202 may transfer location information to the Wireless Device Location Module 140 that includes an MSC ID and a Cell Site ID representing the geographic areas represented by the MSC 206 and the Cell Site 210.

In addition to the geographic location areas represented by MSC ID and Cell Site ID, more precise geographic location information may be obtained and stored by the Mobile Location Server 202 and subsequently passed to the Wireless Device Location Module 140. Optional Location Derivation Equipment 204 may exist within a Wireless Network 200 to derive precise location information of Wireless Device 214 using, for example, Global Positioning System (GPS) technology or Smart Antenna technology. Precise location information may be derived via an exemplary Radio Transceiver System 212, within Cell Site 210, that communicates with Wireless Device 214. The Radio Transceiver System 212 may employ assisted GPS or Smart Antenna Technology. The Radio Transceiver System 212 may work in conjunction with the Location Derivation Equipment 204 to derive precise coordinates for the location of Wireless Device 214. The Location Derivation Equipment 204 may subsequently pass derived detailed coordinates such as Latitude and Longitude, or other projection coordinates, to the Mobile Location Server 202. Regardless of the degree of resolution and the format of geographic location information supported, the Wireless Device Location Module 140 obtains that location information from the Mobile Location Server 202 via the exemplary Data Communications Protocol 142.

FIG. 3 depicts exemplary entries in an exemplary Wireless Device Location Database 120 shown in FIGS. 1 and 2. In particular, as depicted in FIG. 3, a first entry 124 includes an association among a Wireless Device ID 121 (e.g., in this case an MDN), the Location Position 122, a Geographic Place 123 and the Date and Time 129. The Wireless Device ID is used by the Wireless Device Location Module 140 in FIGS. 1 and 2 to either request the Location Position 122 from the Mobile Location Server 202 within the Wireless Network 200 in FIG. 2 or autonomously receive the Location Position 122 from the Mobile Location Server 202 within the Wireless Network 200. The obtained Location Position 122 is then associated with the Geographic Place 123 as well as the Date and Time 129 in the database. The entries for Geographic Place 123 in the database may be pre-populated for the obtained Location Position 122 or otherwise derived based upon known mapping information within the database. Examples of the Location Position 122 value obtained via the Wireless Device Location Module 140 in FIGS. 1 and 2 may be MSC ID, Cell Site ID, Cell Site/Cell Sector ID, Latitude or Longitude coordinates or any other projection coordinates that may be associated with a Geographic Place 123. Examples of the Geographic Place 123 entries in the database are a Geographic Name, some Geographic Identifier (ID) value that facilitates a subsequent location comparison or Coordinates that may take on the form of Latitude and Longitude or any other projection coordinates that may facilitate a subsequent location comparison. Examples of the Date and Time 129 entries in the database are also provided. The Date and Time 129 entries may, for example, represent a previously known date and time of a particular obtained wireless device location to assist in determining, for example, the authenticity or validity of some activity being performed.

Figure 4:
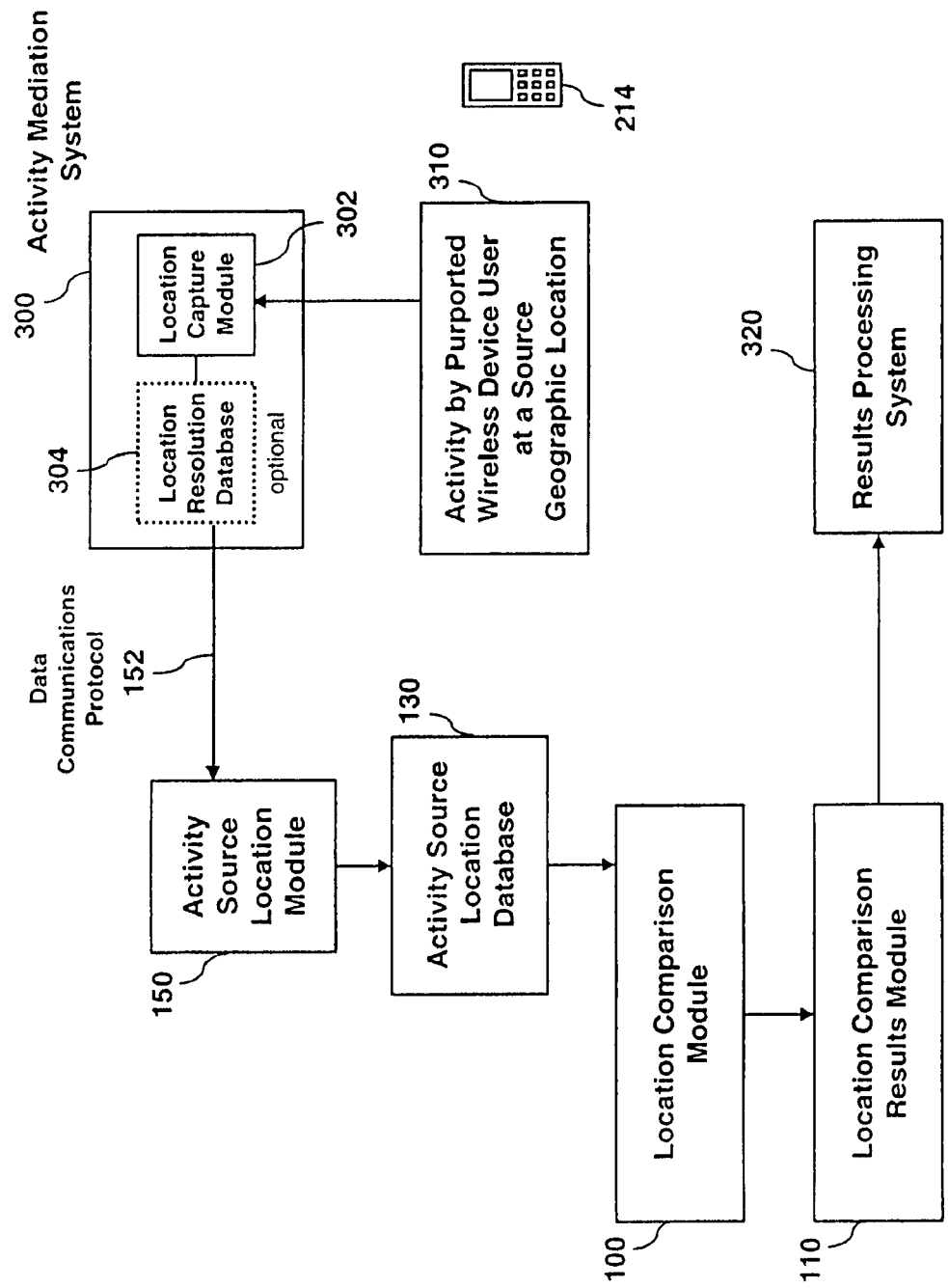
FIG. 4 shows exemplary connectivity of an Activity Mediation System to the Activity Source Location Module and the concerned functional entities of an exemplary Activity Mediation System including an exemplary Location Capture Module and an optional Location Resolution Database.

FIG. 4 depicts an exemplary Data Communications Protocol 152 between the Activity Source Location Module 150 of the Location Comparison Engine and an exemplary and optional Location Resolution Database 304 within the Activity Mediation System 300. The Location Resolution Database 304 may be used to resolve raw location information obtained via the Location Capture Module 302 of the Activity Mediation System 300 depending on the format of the location information obtained by the Location Capture Module 302.

Activity source location information is obtained by the Activity Source Location Module 150 via the Data Communications Protocol 152. The Activity Source Location Module 150 may receive an autonomous request from the Activity Mediation System 300 to compare the location of the wireless device with the location of the user accessing an application or engaged in some automated activity supported by the Activity Mediation System 300. Similarly, a request may be made by the Activity Source Location Module 150 to obtain the activity source location to be used for comparison. The Data Communications Protocol 152 may be based, for example, on the Internet Protocol (IP). Examples of the communications protocols used to transfer location information may include, but are not limited to, the Transmission Control Protocol (TCP/IP), the User Datagram Protocol (UDP/IP) and the Hyper-Text Transport Protocol (HTTP). The exemplary Location Capture Module 302 may retrieve and store location information about any purported transaction or activity detected from a transactional or other application-based activity by a Wireless Device User accessing the system or network at some Source Geographic Location 310. In FIG. 4, the Location Capture Module 302 may obtain and store the current or latest known location information detected from a transactional or other application-based activity by the Wireless Device User 310. Examples of transactional or application-based activities may be a point of sale (POS) consumer transactions, financial interactions with Automated Teller Machines (ATMs) or accessing social communications applications such as social networking applications or online multiplayer gaming applications. The Location Capture Module 302 may obtain and store the location information derived from the Source Geographic Location 310. The format of the obtained Source Geographic Location 310 information may be a commonly used format or some custom format used by a particular Activity Mediation System 300. Example formats of this location information may be a physical geographic address (e.g., any one, or more, of street number, street name, city, state, province, country, postal code, ZIP code, etc.), a physical data communications address (e.g., an Internet Protocol geographic address of the form XX.XX.XX.XX), a logical or virtual place or data communications address (e.g., a post office box or a uniform resource locator or URL address), some representation of an address (e.g., an alias name or label identifying an address), a geographic place name (e.g., "Central Park"), mapping coordinates (e.g., Latitude and Longitude or other projection coordinates) or a mapping identifier in some customized format.

In addition to the example Source Geographic Location 310 areas provided, more precise geographic location information may be obtained and stored by the Location Capture Module 302 and subsequently passed to the Activity Source Location Module 150. For example, the Wireless Device User 310 may be accessing a GPS-based application or the Activity Mediation System 300 may in fact be a Wireless Network that is the same Wireless Network 200 or another Wireless Network that has similar capabilities to Wireless Network 200.

FIG. 5 depicts exemplary entries in an exemplary Activity Source Location Database 130 shown in FIGS. 1 and 4. In particular, as depicted in FIG. 5, a first entry 134 includes an association among a Wireless Device ID 121 (e.g., in this case an MDN), the Activity Source Location 132, a Geographic Place 133 as well as the Date and Time 138 in the database. The Wireless Device ID is used by the Activity Source Location Module 130 in FIGS. 1 and 4 to either request the Location Position 132 from the Location Capture Module 302 (or optionally from the Location Resolution Database 304 that may be used within the Activity Mediation System 300 in FIG. 4 to apply an appropriate format to facilitate use of the derived location information) within the Activity Mediation System 300 in FIG. 4 or autonomously receive the Activity Source Location 132 from the Location Capture Module 302 within the Activity Mediation System 300. The obtained Activity Source Location 132 is then associated with the Geographic Place 133 in the database. The entries for Geographic Place 133 in the database may be pre-populated for the obtained Activity Source Location 132 or otherwise derived based upon known mapping information within the database. Examples of the Activity Source Location 132 value obtained via the Activity Source Location Module 150 in FIGS. 1 and 4 may be a commonly used format or some custom format used by a particular Activity Mediation System 300. Example formats of this location information may be a physical geographic address (e.g., any one, or more, of street number, street name, city, state, province, country, postal code, ZIP code, etc.), a physical data communications address (e.g., an Internet Protocol geographic address of the form XX.XX.XX.XX), a logical or virtual place or data communications address (e.g., a post office box or a uniform resource locator or URL address), some representation of an address (e.g., an alias name or label identifying an address), a geographic place name (e.g., "Central Park"), mapping coordinates (e.g., Latitude and Longitude or other projection coordinates) or a mapping identifier in some customized format. Examples of the Geographic Place 133 entries in the database are a Geographic Name, some Geographic Identifier (ID) value that facilitates a subsequent location comparison or Coordinates that may take on the form of Latitude and Longitude or any other projection coordinates that may facilitate a subsequent location comparison. Examples of the Date and Time 138 entries in the database are also provided. The Date and Time 138 entries may, for example, represent a previously known date and time of a particular obtained activity location to assist in determining, for example, the authenticity or validity of some activity being performed.

Figure 6:
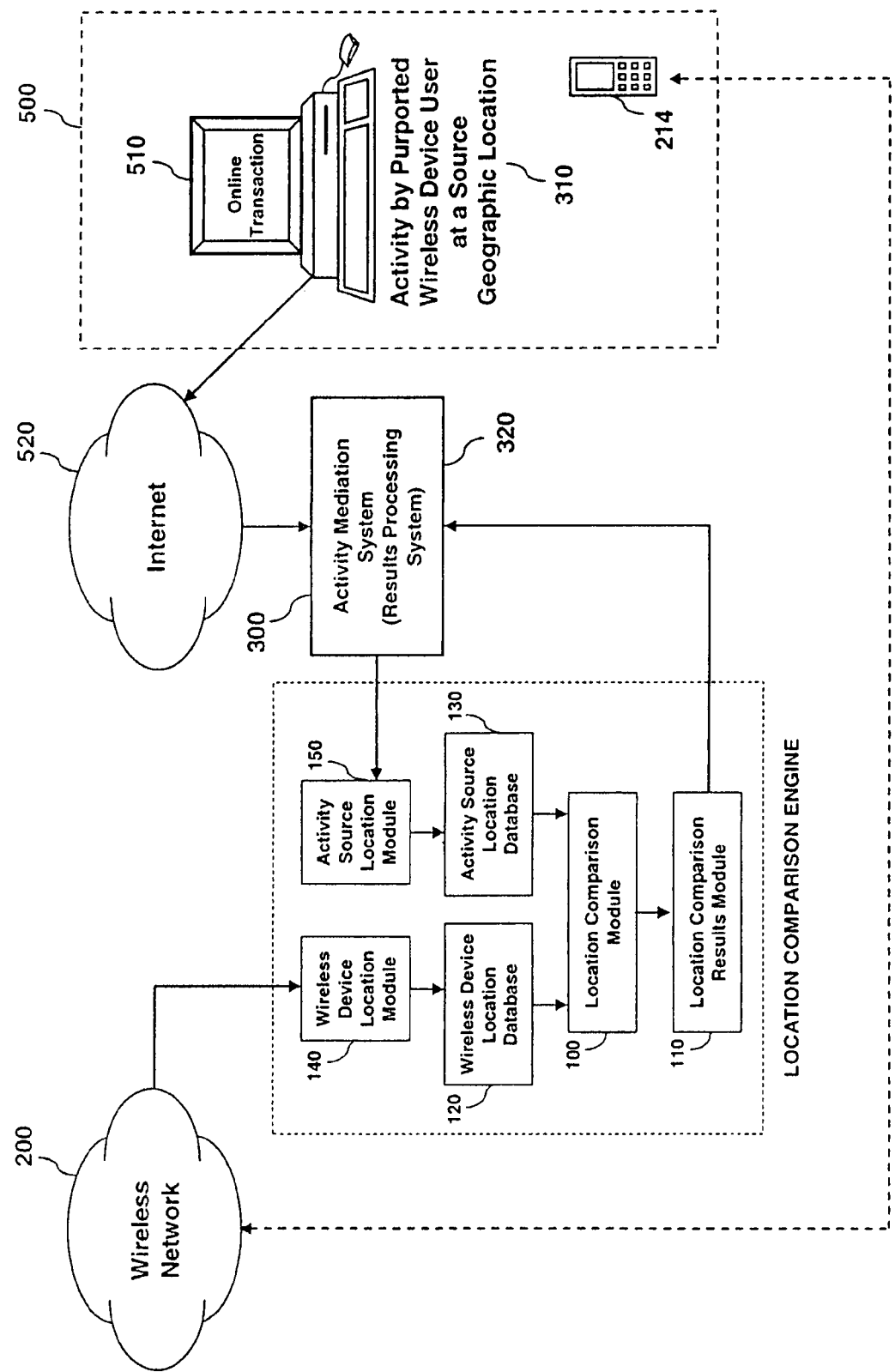
FIG. 6 shows an exemplary scenario whereby the location of an online user transaction from a personal computer is compared with the location of a wireless device where the result of such a location comparison is close location proximity.

FIG. 6 depicts one embodiment of the present invention whereby the Activity of a Purported Wireless Device User at a Source Geographic Location 310 is an Online Transaction, such as an electronic commerce (e-commerce) transaction. In this example, the Wireless Device User 310 and the Wireless Device 214, are within close proximity of each other and within the same Geographic Area 500. The Wireless Device User 310 may access a Personal Computer 510 to make an online purchase of goods or services via an automated e-commerce application accessible via the Internet 520. The Personal Computer 510 maintains a geographically-based physical internet protocol (IP) address in the format XX.XX.XX.XX that may be used by the e-commerce application. In this example, the Personal Computer 510 is within some Geographic Area 500 represented by the geographically-based physical IP address. The Activity Mediation System 300 may host the e-commerce application being accessed by the Wireless Device User 310. The Wireless device User 310 may provide, for example, a Mobile Directory Number (MDN) to serve as a Wireless Device ID while accessing the e-commerce application, or may have previously provided the MDN that may be registered or otherwise stored within a personal profile by the e-commerce application. As the Wireless Device User 310 proceeds within the e-commerce application, a need for the Activity Mediation System 300 to authenticate, validate, or verify that Wireless Device User 310, or the activity invoked by the Wireless Device User 310, may occur, for example, to process an online financial transaction or payment. In this example, the Activity Mediation System 300 passes the Wireless Device User's 310 MDN and physical IP address of the Wireless Device User's 310 Personal Computer 510 to the exemplary Location Comparison Engine. The Location Comparison Engine may subsequently request the location of the Wireless Device 214 from the Wireless Network 200. To facilitate the location request from the Wireless Network 200, the MDN of the Wireless Device 214 previously obtained from the Activity Mediation System 300 may be used. In this embodiment of the present invention, the Location Comparison Engine receives the requested location of the Wireless Device 214 from the Wireless Network 200 and compares that location with the physical IP address received from the Activity Mediation System 300. This comparison is initiated, invoked and performed, for example, as described for FIGS. 1, 2, and 4 using databases as described for FIGS. 3 and 5. The exemplary Location Comparison Results Module 110 may then assign a result to the location comparison. As the Wireless Device User 310 is within the same Geographic Area 500 as the Wireless Device 214, the Location Comparison Results Module 110, assigns a result indicating that the Wireless Device User 310 is within the same Geographic Area 500 as the Wireless Device 214. The Location Comparison Results Module 110 may then provide these results to the Results Processing System 320, which, in this example, resides as part of the Activity Mediation System 300. The exemplary Activity Mediation System 300 may use the obtained location comparison results to, for example, demonstrate some degree of positive authentication, verification or validation of the Wireless Device User 310, or the Online Transaction activity being performed by the Wireless Device User 310, as it may be reasonable to assume that the Wireless Device User 310 who owns the Wireless Device 214 has the device with him.

Figure 7:
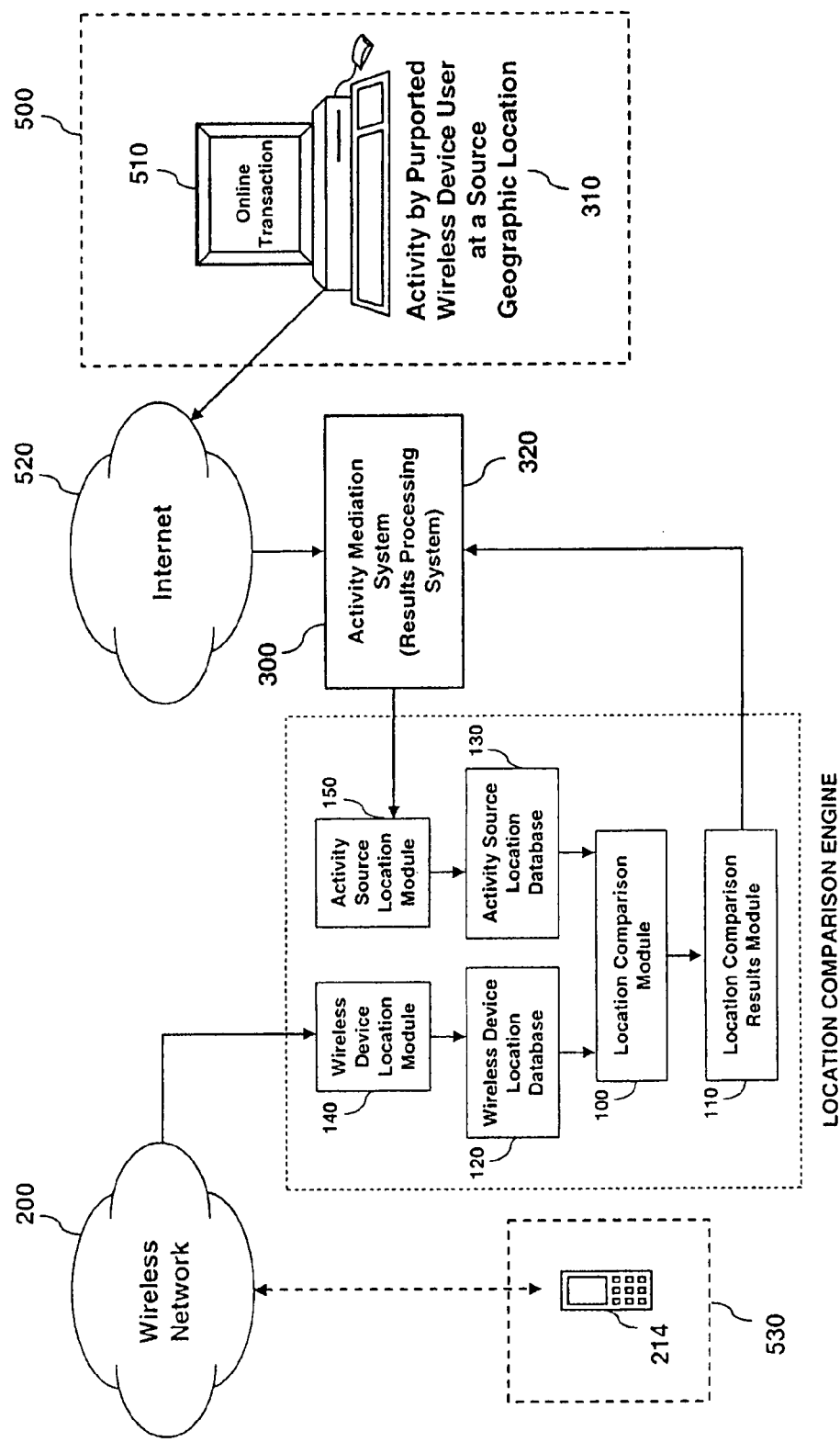
FIG. 7 shows an exemplary scenario whereby the location of an online user transaction from a personal computer is compared with the location of a wireless device where the result of such a location comparison is far location proximity.

FIG. 7 depicts another embodiment of the present invention whereby the Activity of a Purported Wireless Device User at a Source Geographic Location 310 is an Online Transaction, such as an electronic commerce (e-commerce) transaction. In this example, the Wireless Device User 310 and the Wireless Device 214, are not within close proximity of each other and are not within the same Geographic Area 500. In this example, the Wireless Device 214 is within some other Geographic Area 530. The Wireless Device User 310 may access a Personal Computer 510 to make an online purchase of goods or services via an automated e-commerce application accessible via the Internet 520. The Personal Computer 510 maintains a geographically-based physical internet protocol (IP) address in the format XX.XX.XX.XX that may be used by the e-commerce application. In this example, the Personal Computer 510 is within some Geographic Area 500 represented by the geographically-based physical IP address. The Activity Mediation System 300 may host the e-commerce application being accessed by the Wireless Device User 310. The Wireless device User 310 may provide, for example, a Mobile Directory Number (MDN) to serve as a Wireless Device ID while accessing the e-commerce application, or may have previously provided the MDN that may be registered or otherwise stored within a personal profile by the e-commerce application. As the Wireless Device User 310 proceeds within the e-commerce application, a need for the Activity Mediation System 300 to authenticate, validate, or verify that Wireless Device User 310, or the activity invoked by the Wireless Device User 310, may occur, for example, to process an online financial transaction or payment. In this example, the Activity Mediation System 300 passes the Wireless Device User's 310 MDN and physical IP address of the Wireless Device User's 310 Personal Computer 510 to the exemplary Location Comparison Engine. The Location Comparison Engine may subsequently request the location of the Wireless Device 214 from the Wireless Network 200. To facilitate the location request from the Wireless Network 200, the MDN of the Wireless Device 214 previously obtained from the Activity Mediation System 300 may be used. In this embodiment of the present invention, the Location Comparison Engine receives the requested location of the Wireless Device 214 from the Wireless Network 200 and compares that location with the physical IP address received from the Activity Mediation System 300. This comparison is initiated, invoked and performed, for example, as described for FIGS. 1, 2, and 4 using databases as described for FIGS. 3 and 5. The exemplary Location Comparison Results Module 110 may then assign a result to the location comparison. As the Wireless Device User 310 is not within the same Geographic Area 500 as the Wireless Device 214, the Location Comparison Results Module 110, assigns a result indicating that the Wireless Device User 310 is not within the same Geographic Area 500 as the Wireless Device 214. The Location Comparison Results Module 110 may then provide these results to the Results Processing System 320, which, in this example, resides as part of the Activity Mediation System 300. The exemplary Activity Mediation System 300 may use the obtained location comparison results to, for example, demonstrate some degree of negative authentication, verification or validation of the Wireless Device User 310, or the Online Transaction activity being performed by the Wireless Device User 310, as it may be reasonable to assume that the Wireless Device User 310 who owns the Wireless Device 214 should have the device with him.

Figure 8:
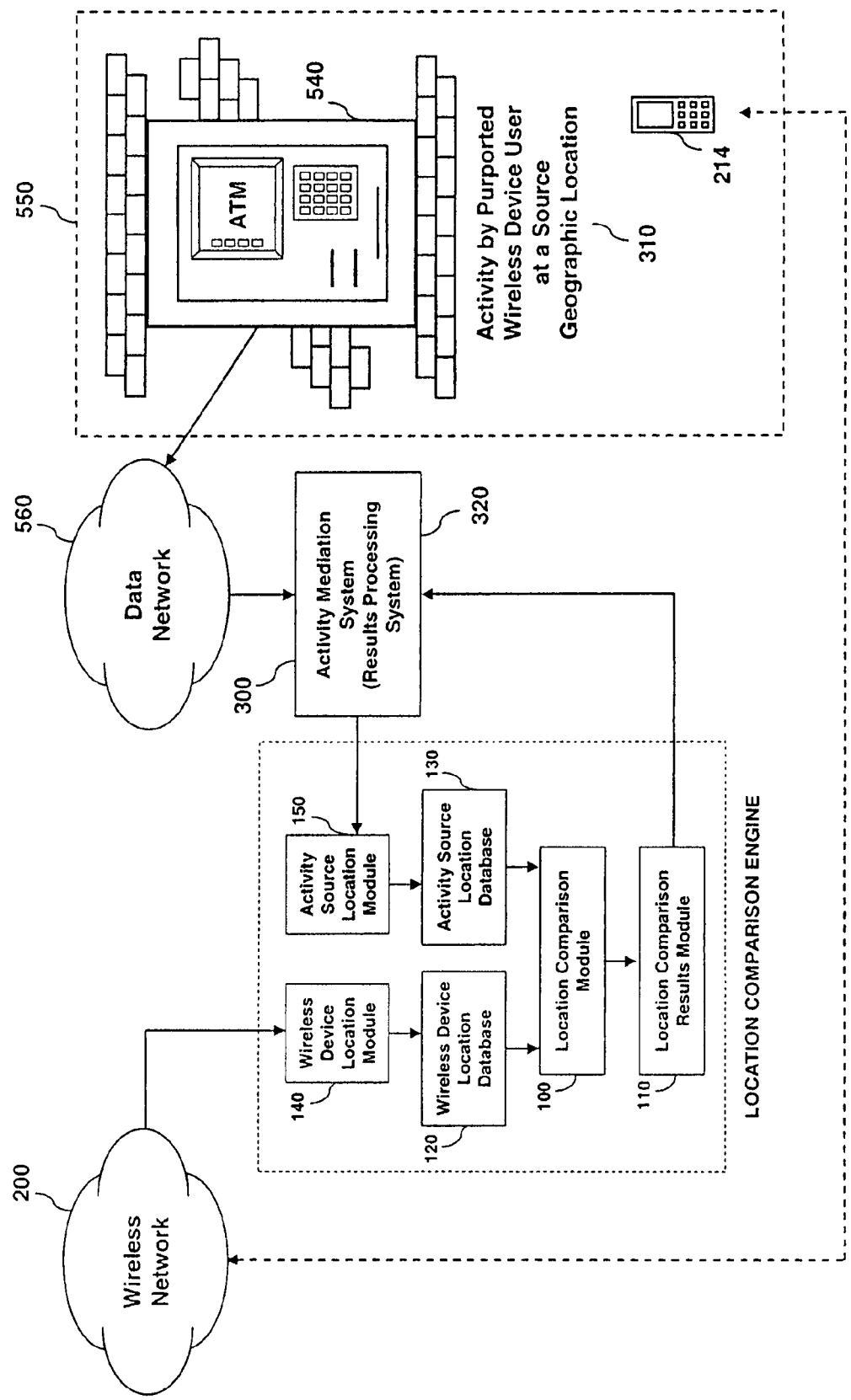
FIG. 8 shows an exemplary scenario whereby the location of an Automated Teller Machine (ATM) transaction is compared with the location of a wireless device where the result of such a location comparison is close location proximity.

FIG. 8 depicts another embodiment of the present invention whereby the Activity of a Purported Wireless Device User at a Source Geographic Location 310 is obtaining money from an Automated Teller Machine (ATM) 540. In this example, the Wireless Device User 310 and the Wireless Device 214, are within close proximity of each other and within the same Geographic Area 550. The Wireless Device User 310 may access an ATM 540 to obtain money. The ATM 540 maintains a geographically-based physical data address that may be an IP address in the format XX.XX.XX.XX or some other proprietary data communications address used by ATM or financial institution associated with the ATM. In this example, the ATM 540 is within some Geographic Area 550 represented by the geographically-based physical data communications address. The Activity Mediation System 300 may support the ATM application being accessed by the Wireless Device User 310. The Wireless device User 310 may provide, for example, a Mobile Directory Number (MDN) to serve as a Wireless Device ID while accessing the ATM application, or may have previously provided the MDN that may be registered or otherwise stored within a personal profile accessed by the ATM application. As the Wireless Device User 310 proceeds within the ATM application, a need for the Activity Mediation System 300 to authenticate, validate, or verify that Wireless Device User 310, or the activity invoked by the Wireless Device User 310, may occur, for example, to process a cash withdrawal. In this example, the Activity Mediation System 300 passes the Wireless Device User's 310 MDN and physical data communications address of the ATM 540 to the exemplary Location Comparison Engine. The Location Comparison Engine may subsequently request the location of the Wireless Device 214 from the Wireless Network 200. To facilitate the location request from the Wireless Network 200, the MDN of the Wireless Device 214 previously obtained from the Activity Mediation System 300 may be used. In this embodiment of the present invention, the Location Comparison Engine receives the requested location of the Wireless Device 214 from the Wireless Network 200 and compares that location with the physical data communications address received from the Activity Mediation System 300. This comparison is initiated, invoked and performed, for example, as described for FIGS. 1, 2, and 4 using databases as described for FIGS. 3 and 5. The exemplary Location Comparison Results Module 110 may then assign a result to the location comparison. As the Wireless Device User 310 accessing the ATM 540 is within the same Geographic Area 550 as the Wireless Device 214, the Location Comparison Results Module 110, assigns a result indicating that the Wireless Device User 310 is within the same Geographic Area 550 as the Wireless Device 214. The Location Comparison Results Module 110 may then provide these results to the Results Processing System 320, which, in this example, resides as part of the Activity Mediation System 300. The exemplary Activity Mediation System 300 may use the obtained location comparison results to, for example, demonstrate some degree of positive authentication, verification or validation of the Wireless Device User 310, or the ATM 540 transaction activity being performed by the Wireless Device User 310, as it may be reasonable to assume that the Wireless Device User 310 who owns the Wireless Device 214 has the device with him.

FIG. 9 depicts an exemplary relationship among exemplary information elements within an exemplary Location Comparison Module 100 in FIGS. 1, 2 and 4. The Location Comparison Module 100 compares the location information resolved by and obtained from both the Wireless Device Location Database 120 in FIGS. 1 and 2 and the Activity Source Location Database 130 in FIGS. 1 and 4. The Location Comparison Module 100 may use a common Wireless Device ID 121 in FIGS. 3 and 5, originally obtained from the Wireless Network 200 and the Activity Mediation System 300, to associate the locations to compare. The Location Comparison Module 100 may compare the values obtained from the Wireless Device Location Database 120 in FIGS. 1 and 2, for Location Position 122 in FIG. 3 and Geographic Place 123 in FIG. 3 or both, with the values obtained from the Activity Source Location Database 130 in FIGS. 1 and 4, for Activity Source Location 132 in FIG. 5 and Geographic Place 133 in FIG. 5 or both. To perform a proper location comparison, it may be necessary to determine a proper association between the obtained location information from both the Wireless Network 200 and the Activity Mediation System 300 with a common location format. This association may be performed, for example, within both the Wireless Device Location Database 120 and the Activity Source Location Database 130 prior to the location comparison. The comparison process produces one or more proximity-based results among the locations input to the Location Comparison Module 100. The results of the comparison, as well as the associated Wireless Device ID 121 pertaining to the comparison are then passed to a Location Comparison Results Module 110 in FIGS. 1, 2 and 4.

An exemplary Location Comparison Results Module 110 is depicted in FIGS. 1, 2 and 4. The Location Comparison Results Module 110 analyzes the proximity information obtained from the Location Comparison Module 100 in FIGS. 1, 2 and 4 and assigns one or more results to the Wireless Device ID 121 associated with the comparison results. These results may be assigned, for example, based on the degree of proximity determined by the location comparison. The degree of proximity and the algorithm used to determine the results may vary among applications or automated activities making use of the exemplary Location Comparison Engine. The results may be attributed to and made available in a multiplicity of exemplary formats such as arithmetic rankings, scores based on an acceptable predefined distance or a Boolean expression based on a predetermined distance threshold (e.g., a "true" result if the comparison is within a predefined distance or a "false" result if the comparison is outside a predefined distance). The results may also take the form of the appropriately formatted independent locations themselves for use in a particular application. This may be the case when an application requires the locations themselves to add utility or value to the application, such as in a social networking application that may display the locations to the application users. The Location Comparison Results Module 110 depicted in FIGS. 1, 2 and 4 may then pass the appropriately formatted results of the location comparison for a particular application along with the associated Wireless Device ID 121 to an exemplary Results Processing System 320 as depicted in FIGS. 1, 2 and 4. The Results Processing System 320 may reside within, or be the same as, the Activity Mediation System 300 depicted in FIGS. 1 and 4, or may be some other system that requires the location comparison results. The Results Processing System 320 may apply the comparison results to any type of application regardless of the results or the type of application. The results may be provided in a multiplicity of formats and used to authenticate, verify or validate a transaction or activity performed through the application, or provide some utility to an application where the results of a comparison of those locations is required.

Figure 10:
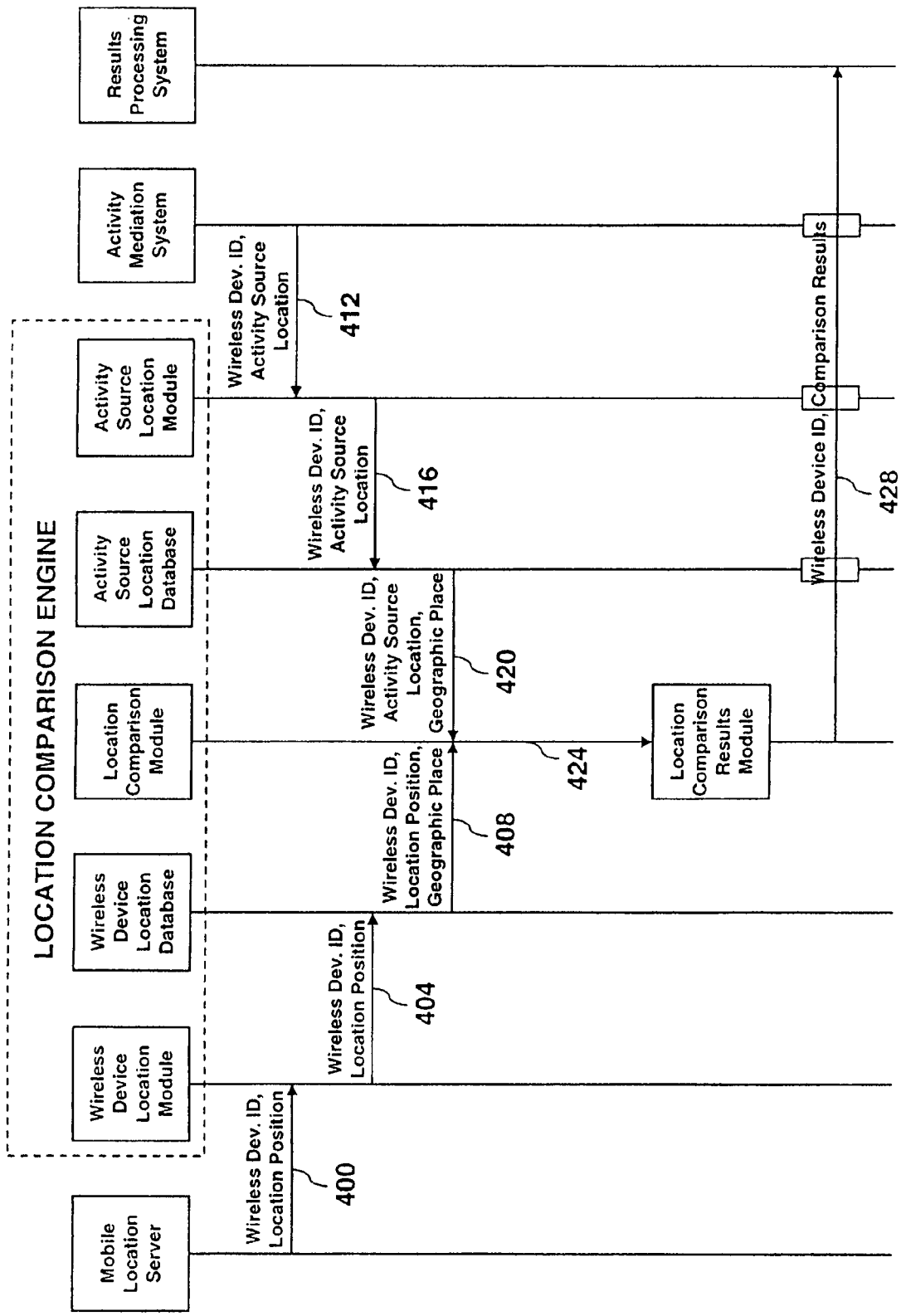
FIG. 10 shows an exemplary information flow diagram of the Location Comparison Engine.

FIG. 10 is an exemplary detailed information and system flow diagram representing the location comparison operation of a Location Comparison Engine, in accordance with one embodiment of the present invention. In this exemplary information and system flow, a Wireless Device User may initially invoke some transaction or application-based activity at a Source Geographic Location 310 in FIGS. 1 and 4.

Step 400: The Wireless Device Location Module obtains the Wireless Device ID and associated Location Position of that Wireless Device ID from the Mobile Location Server. The obtained Location Position may have been previously queried from the Mobile Location Server or may have been passed autonomously from the Mobile Location Server.

Step 404: The Wireless Device Location Module passes the Wireless Device ID along with the associated Location Position to the Wireless Device Location Database. The Location Position may be associated with a Geographic Place within the Wireless Device Location Database.

Step 408: The Wireless Device Location Database passes the Wireless Device ID along with the Location Position, the Geographic Place, or both to the Location Comparison Module.

Step 412: The Activity Source Location Module obtains the Wireless Device ID and associated Activity Source Location of that Wireless Device ID from the Activity Mediation System. The obtained Activity Source Location may have been previously queried from the Activity Mediation System or may have been passed autonomously from the Activity Mediation System. Note that Step 412 may occur after Step 400 or before Step 400.

Step 416: The Activity Source Location Module passes the Wireless Device ID along with the associated Activity Source Location to the Activity Source Location Database. The Activity Source Location may be associated with a Geographic Place within the Activity Source Location Database.

Step 420: The Activity Source Location Database passes the Wireless Device ID along with the Activity Source Location, the Geographic Place, or both to the Location Comparison Module.

Step 424: The Location Comparison Module analyzes the location information obtained from both the Wireless Device Location Database and the Activity Source Location Database and sends proximity results of the analysis to the Location Comparison Results Module.

Step 428: The Location Comparison Results Module obtains the location comparison results and assigns one or more values or otherwise formats the results appropriately for use in a particular application. The results, along with the associated Wireless Device ID, are then passed to the Results Processing System to effect some utility in the concerned transaction or application activity performed by the Wireless Device User. For example, if the location comparison results demonstrate close proximity of the user to the application being accessed or the activity being performed, a reasonable assertion may be made that the user is authentic, or the activity being performed is valid. In contrast, if the location comparison results demonstrate far proximity of the user to the application being accessed or the activity being performed, a reasonable assertion may be made that the user is not authentic, or the activity being performed is invalid. The present invention enables the comparison of the location of a Wireless Device with the location of the User of a Wireless Device engaging in some automated transaction or activity where the proximity of the locations compared has some utility. Examples of this utility may be to authenticate, verify or validate the User's transaction or activity such that it may be determined that the User is in fact who he claims to be, or to provide proximity information about the compared locations that may add value to some application, such as in social networking or online gaming.

Figure 11:
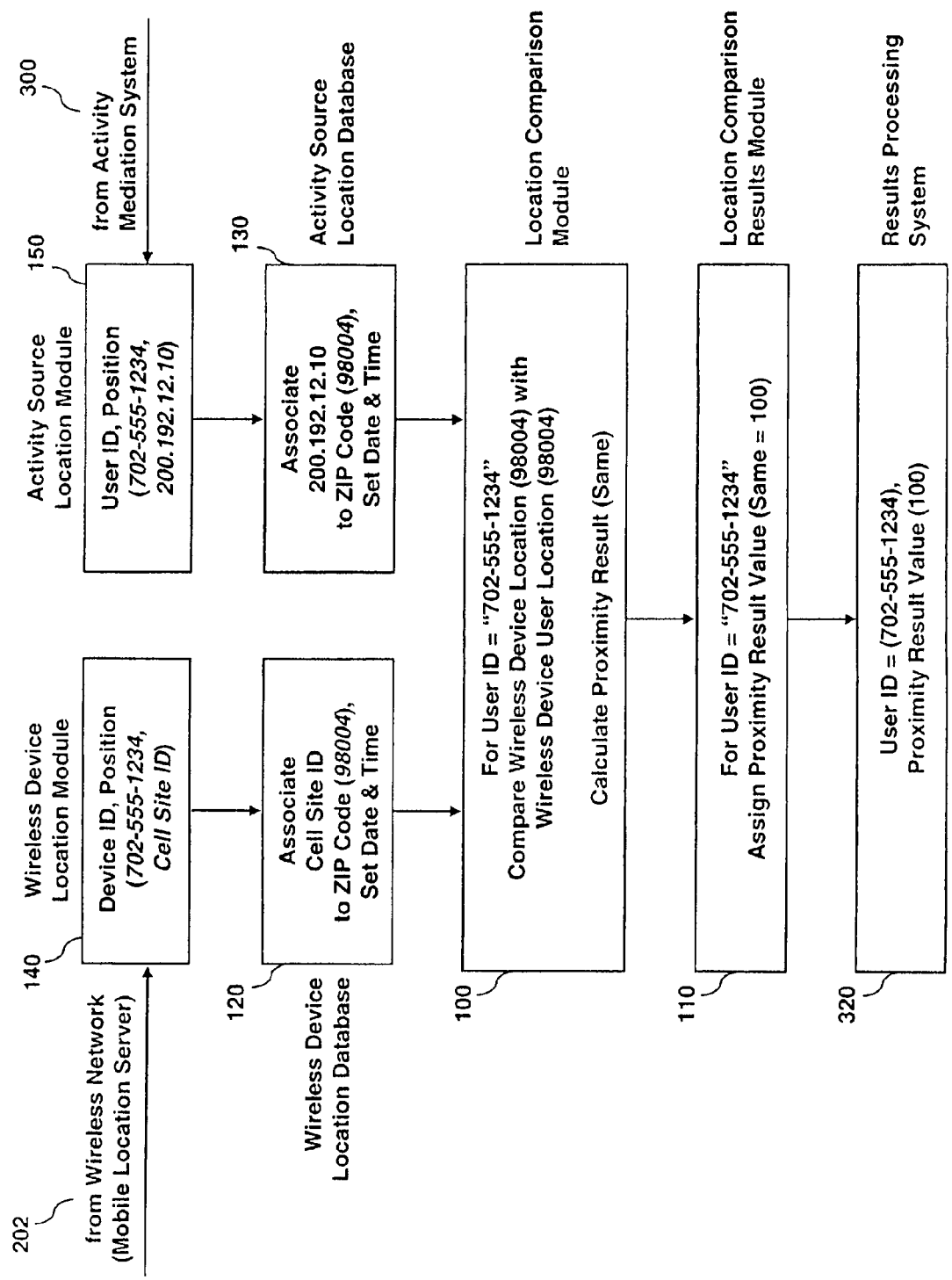
FIG. 11 shows an exemplary process flow diagram of the Location Comparison Engine.

FIG. 11 is an exemplary detailed process flow diagram representing the location comparison operation of a Location Comparison Engine, in accordance with one embodiment of the present invention. In this exemplary process flow, a Wireless Device User may initially invoke some transaction or application-based activity at a Source Geographic Location 310 in FIGS. 1, 4, 6, 7 and 8. In this exemplary process flow, the User ID and Position are provided to the Activity Source Location Module 150 by the Activity Mediation System 300. An exemplary value for the User ID may be "702-555-1234" which serves as the Wireless Device ID and, more specifically, the MDN of the Wireless Device User. An exemplary value for Position may be "200.192.12.10" and serves as a physical and geographically-based IP address of some application accessed by the Wireless Device User. Similarly, in this exemplary process flow, the Wireless Device ID and Position are provided to the Wireless Device Location Module 140 by the Wireless Network 200. An exemplary value for the Wireless Device ID may be "702-555-1234" which serves as the MDN of the Wireless Device User. An exemplary value for Position may be "Cell Site ID" which serves as a physical and geographically-based area that may be currently serving the Wireless Device represented by the MDN.

The Activity Source Location Module 150 passes the User ID and Position to the Activity Source Location Database 130. In this example, the Activity Source Location Database 130 associates the physical and geographically-based IP address with a geographically-based ZIP code, "98004," and sets the current date and time. The date and time represents the date and time that the location of some activity accessed by the Wireless Device User occurred. Similarly, the Wireless Device Location Module 140 passes the User ID and Position to the Wireless Device Location Database 120. In this example, the Wireless Device Location Database 120 associates the physical and geographically-based Cell Site ID with a geographically-based ZIP code, "98004," and sets the current date and time. The date and time represents the date and time that the location of the Wireless Device was detected. The recorded date and time information may be used, for example, as the last known date and time of a Wireless Device User's location when current location information is unavailable or unobtainable. Both the Wireless device Location Database 130 and the Activity Source Location Database 130 pass the respective User IDs, in this case "702-555-1234," and resolved locations, in this case "98004," to the exemplary Location Comparison Module 100. The Location Comparison Module 100 associates the respectively received locations with each other based on the common User ID "702-

555-1234" and compares the two associated locations associated with that User ID. In this example, both locations have the value "98004" for the specified User ID. The Location Comparison Module 100 then calculates a Proximity Result for the comparison. In this example, the comparison reveals that the Wireless Device User and the Wireless Device are at the "same" location, that is, in ZIP code 98004. The Location Comparison Module 100 then passes the User ID "702-555-1234" and the Proximity Result "Same" to the exemplary Location Comparison Results Module 110. The Location Comparison Results Module 110 assigns a Proximity Result Value for the received proximity result. In this example, the value "100" is assigned to a proximity result for a location comparison that reveals that the Wireless Device is in the "Same" location as the Wireless Device User. The Location Comparison Results Module 110 then passes the User ID "702-555-1234" and the Proximity Result Value "100" to some Results Processing System 320. The Results Processing System 320 may then apply the Proximity Result Value to, for example, an authentication, verification or validation algorithm that it uses to authenticate, validate or verify the Wireless Device User's identity or automated activity being performed by the Wireless Device User.

In accordance with the principles of the present invention, a Location Comparison Engine is provided. The Location Comparison Engine comprises modules that obtain wireless device location from a Wireless Network as well as the location of the wireless device user from some other Activity Mediation System. The Activity Mediation System represents any data communications network or system that has the ability to derive location information about an automated activity being performed at some place. This activity may be a commercial point of sale (POS) transaction at a retail establishment, an online banking transaction from a personal computer, an e-commerce transaction from a personal computer, a computer-automated voting application, an automated alarm system, or the invocation of any automated application where geographic location information of the transaction or activity taking place may be derived. The obtained wireless device location and the wireless device user's location are compared within a Location Comparison Module. The Location Comparison Module determines the proximity of the locations being compared and passes the results of the comparison to a Location Comparison Results Module. These results are then properly formatted and sent to a Results Processing System where they may be applied to a particular application.

The present invention provides multiple benefits. The use of a Location Comparison Engine may significantly reduce fraudulent financial transactions protecting Wireless Device Users as well as financial institutions. It provides confirmation for any type of secure transaction by Wireless Device Users and may reduce the incidence of false positive indications of fraud using only traditional fraud detection mechanisms in use today. Additionally, results of a location comparison as described in the present invention may add utility to social networking applications or online gaming applications as it may benefit Wireless Device Users to know how close in proximity friends are who are engaging in those applications.

While the invention has been described with reference to the exemplary embodiments thereof, those skilled in the art will be able to make various modifications to the described embodiments of the invention without departing from the true spirit and scope of the invention.

What is claimed is:

1. A method of determining fraudulent activity, the method comprising the steps of:
    receiving, over a first network and in response to a transaction initiated by a user of an electronic device, information identifying the location of the electronic device, the transaction requiring authentication of an identity of the user;
    sending a request over a second network accessible to a wireless device associated with the user to obtain information identifying the location of the wireless device;
    receiving, over the second network, the information identifying the location of the wireless device;
    caching the information identifying the location of the wireless device for comparison with the information identifying the location of the electronic device;
    associating a date and time of the cached information identifying the location of the wireless device with the information identifying the location of the wireless device;
    generating a comparison of the cached information identifying the location of the wireless device with the information identifying the location of the electronic device;
    evaluating results of the comparison based on proximity of the compared locations;
    applying an algorithmic value to the results indicating a relative degree of proximity of the location of the wireless device with the location of the electronic device; and
    sending the algorithmic value to a processing system configured to determine, based on the algorithmic value, the authenticity of the identity of the user.

2. The method of claim 1, wherein a database is employed associating wireless device locations with locations of wireless device users using a common wireless device identifier.

3. The method of claim 1, wherein a database is employed associating a wireless device location identified by a wireless device identifier with a location of an individual identified by another form of identifier.

4. The method of claim 1, wherein a database is employed associating the date and time of an obtained wireless device location identified by a wireless device identifier with another date and time of an obtained wireless device location identified by a wireless device identifier.

5. The method of claim 1, wherein results of the comparison are used to validate a wireless device user's identity.

6. The method of claim 1, wherein results of the comparison are used to invalidate a wireless device user's identity.

7. The method of claim 1, wherein results of the comparison are sent to a results processing system where the results may be used for an application to demonstrate the proximity of the wireless device user to another location.

8. The method of claim 1, wherein the wireless device comprises a mobile telephone.

* * * * *